(12) United States Patent
Rope

(10) Patent No.: US 9,634,760 B1
(45) Date of Patent: *Apr. 25, 2017

(54) SYSTEM AND METHOD FOR CALIBRATION OF AN OPTICAL MODULE

(71) Applicant: INPHI CORPORATION, Santa Clara, CA (US)

(72) Inventor: Todd Rope, Glendale, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,163

(22) Filed: Jan. 16, 2017

Related U.S. Application Data

(63) Continuation of application No. 14/860,548, filed on Sep. 21, 2015, now Pat. No. 9,553,663.

(51) Int. Cl.
*H04B 10/08* (2006.01)
*H04B 10/077* (2013.01)
*H04B 10/079* (2013.01)

(52) U.S. Cl.
CPC ... *H04B 10/0775* (2013.01); *H04B 10/07955* (2013.01); *H04B 10/07957* (2013.01)

(58) Field of Classification Search
CPC .......... H04B 10/0775; H04B 10/07955; H04B 10/0795; H04B 10/07957; H04B 10/6165; H04B 7/086; H04B 10/07; H04B 10/0799; H04B 10/0731; H04B 10/0777; H04J 3/14; G01D 18/008; G01R 35/005
USPC ......................................................... 398/25
See application file for complete search history.

(56) References Cited

U.S. PATENT DOCUMENTS

| | | | | |
|---|---|---|---|---|
| 5,780,843 A | * | 7/1998 | Cliche | G01J 3/10 250/205 |
| 6,816,261 B2 | * | 11/2004 | Patel | G01J 3/447 356/364 |
| 6,952,531 B2 | * | 10/2005 | Aronson | G01M 11/00 398/135 |
| 7,181,146 B1 | * | 2/2007 | Yorks | H04B 10/504 398/195 |
| 7,315,370 B2 | * | 1/2008 | Barwicz | H04B 10/07957 356/326 |

(Continued)

*Primary Examiner* — Hibret Woldekidan
(74) *Attorney, Agent, or Firm* — Richard T. Ogawa; Ogawa P.C.

(57) ABSTRACT

A system and method for calibrating an optical module. The optical module including a microprocessor with non-volatile memory is provided at a calibration station for measuring calibrated value of a device parameter against raw values starting from minimum value in each of multiple zones of a primary parameter with one or more secondary parameters at least being set to a basis calibration point to determine coefficients for generating a N-spline function for the multiple zones and multiple multipliers for each zone corresponding to multiple calibration points. The coefficients and multiple multipliers are stored in the non-volatile memory and reused respectively for calculating a basis calibrated value based on any current raw value of the primary parameter a N-spline function in particular zone and for determining a final multiplier by interpolation of the multiple multipliers associated with the one or more secondary parameters, leading to a calibrated value for any condition.

24 Claims, 6 Drawing Sheets

(56) References Cited

U.S. PATENT DOCUMENTS

| | | | | |
|---|---|---|---|---|
| 7,567,351 B2* | 7/2009 | Opsal | G01B 11/0641 | 356/237.2 |
| 7,769,305 B1* | 8/2010 | Roberts | H04B 10/60 | 398/152 |
| 8,111,986 B1* | 2/2012 | Lindsay | H04B 10/0799 | 398/16 |
| 8,798,475 B2* | 8/2014 | Rope | H04B 10/40 | 398/135 |
| 8,810,796 B2* | 8/2014 | Hays | G01S 17/58 | 356/4.09 |
| 8,866,322 B2* | 10/2014 | Tchoryk, Jr. | G01P 5/26 | 290/44 |
| 8,897,656 B2* | 11/2014 | Curt | H04B 10/079 | 398/188 |
| 8,953,728 B2* | 2/2015 | Chang | H03F 1/0277 | 341/131 |
| 8,989,587 B2* | 3/2015 | Rope | H04B 10/0799 | 375/232 |
| 9,222,951 B2* | 12/2015 | Schmitt | A61B 5/14532 | |
| 9,251,689 B2* | 2/2016 | Xiong | G08B 21/182 | |
| 2007/0241760 A1* | 10/2007 | Yamasaki | G01R 27/28 | 324/601 |
| 2009/0168858 A1* | 7/2009 | Luo | H04B 10/40 | 375/224 |
| 2009/0240945 A1* | 9/2009 | Aronson | H04L 63/08 | 713/176 |
| 2012/0093504 A1* | 4/2012 | Aronson | G01M 11/00 | 398/38 |
| 2012/0251100 A1* | 10/2012 | Rope | H04B 10/40 | 398/25 |
| 2014/0219666 A1* | 8/2014 | Tselniker | H04L 25/03019 | 398/208 |
| 2015/0365174 A1* | 12/2015 | Nazarathy | H04L 25/03019 | 398/209 |
| 2016/0191020 A1* | 6/2016 | Velazquez | H03H 21/0067 | 341/118 |

* cited by examiner

```
typedef struct _DDMICAL_HDR {
    u16 cal_size;                        // total number of bytes in structure
    u8  cal_type;                        // enumeration of possible calibration types
    u8  cal_channel;                     // optional internal channel number
} DDMICAL_HDR;

typedef struct _DDMICAL_ADJ {
    u8 adj_type:4;                       // type of adjuster
    u8 num_points:4;                     // number of points of adjuster
} DDMICAL_ADJ;

typedef struct _DDMICAL_ZONE {
    u32 last_zone:1;                     // mark 1 for last zone
    u32 num_adjusters:3;                 // number of adjusters in zone
    u32 num_coefs:4;                     // coefficient order of zone polynomial
    u32 range_start:24;                  // raw start of zone
    f32 coef[num_coefs];                 // array of zone polynomial coefficients
    DDMICAL_ADJ adj[num_adjusters];      // array of adjuster headers
    align 16                             // used for data alignment
    u16 adj_point[sum(i) of adj[i].num_points]  // list of adjuster points
    f8_8 mult[prod(i) of adj[i].num_points]     // list of adjuster multipliers
} DDMICAL_ZONE;

typedef struct _DDMI_CALINFO {
    DDMICAL_HDR  hdr;                    // header information
    DDMICAL_ZONE zone[number of zones];  // array of zone information
} DDMI_CALINFO;
```

FIG. 6

SYSTEM AND METHOD FOR CALIBRATION OF AN OPTICAL MODULE

CROSS-REFERENCE TO RELATED APPLICATIONS

This application is a continuation of and claims priority to U.S. application Ser. No. 14/860,548, filed Sep. 21, 2015, commonly assigned and incorporated by reference herein for all purposes.

BACKGROUND OF THE INVENTION

The present invention relates to optical module calibration techniques. More particularly, the present invention provides a system and method for calibrating general purpose device parameter of an optical module. Specifically, the system and method are implemented with control logic being fully coded in an internal logic control unit with non-volatile memory before being applied for the characterization of various devices within the optical module.

In an optical module, it may not be known in advance, especially when designing system control logic, exactly how various internal devices will behave. For example, optical module for network communication usually includes multiple different devices manufactured in a high mix environment and needs to be integrated together and operated under one internal logic control unit. The mix of devices may change from time to time. This is particularly true for such optical networking module to select different WDM (wave division multiplexed) or DWDM (dense wave division multiplexing) devices, transmitters, receivers, or transceivers, RF modulator, subsystem for communicating to a host, and/or analog control units, all possibly having different constructions and being designed for different channel wavelengths. Thus, it is inefficient to dedicate a production line or testing station to a particular module or component. Instead, optical modules require a calibrated version of multiple device parameters to be communicated with the host and internal controls also require calibration in order to function properly.

Therefore, it is desired to have improved system and method for optical module calibration that cover various calibration requirements with a minimum of physical memory space requirements and with a minimum of additional overhead at the time of calibration.

BRIEF SUMMARY OF THE INVENTION

The present invention relates to optical module calibration techniques. More particularly, the present invention provides a system and method for calibrating general purpose device parameter of an optical module. The calibration system and method are applied with control logic being fully coded in the optical module before being applied for the characterization of various devices within the optical module, though other applications are possible.

In a specific embodiment, the present invention provides a method of performing calibration of a device parameter of an optical module. The method includes providing said optical module in a calibration station. The optical module includes an internal logic control unit with non-volatile memory capable of measuring raw values of a plurality of primary parameters at all operation conditions including variations of one or more secondary parameters adjusted by the calibration station. Further the method includes determining N number of zones corresponding to a selected primary parameter for calibration of said device parameter, $N \geq 1$ and determining an order n of a polynomial function for each of the N zones wherein $n \geq 0$ and is varied for the N zones. Additionally, the method includes performing calibration measurements for each of the N zones, in which the method includes performing a first plurality of calibration measurements in the selected zone, with the one or more secondary parameters being set at corresponding values selected as a basis point, to obtain a plurality calibrated values of the device parameter measured by a pre-calibrated measurement equipment respectively against a plurality of raw values of the selected primary parameter in the selected zone measured by the optical module to deduce n+1 number of coefficients. Further for each zone, the method includes performing a second plurality of calibration measurements respectively at a second plurality of calibration points to generate a multiplicative factor of the selected zone for each calibration point. Furthermore for each zone, the method includes storing the n+1 number of coefficients for constructing the order n polynomial function and the multiplicative factor associated with each of the second plurality of calibration points for the selected zone into the non-volatile memory. Moreover, the method includes generating an N-spline function for all N zones based on each order n polynomial function for each zone at the basis point. The N-spline function is programmed into an internal logic control unit such as a microprocessor for generating a basis-point calibrated value of the device parameter for the optical module.

In another specific embodiment, the present invention provides a method of delivering a calibrated device parameter of an optical module to be communicated to a host. The method includes providing an optical module comprising a microprocessor with non-volatile memory capable of measuring entire value range of each of one or more primary parameters in association with variations of one or more secondary parameters. The microprocessor is programmed with an internal control logic comprising at least a N-spline function for N number of zones incrementally over the entire value range of a selected primary parameter for generating a corresponding calibrated value of said selected device parameter along with the non-volatile memory being configured to store at least a plurality of multiplicative factors respectively associated with the plurality of sets of values of the one or more secondary parameters for each of the N number of zones. Additionally, the method includes measuring a current raw value of the selected primary parameter at a current set of values of the one or more secondary parameters. The method further includes determining the current raw value in a first zone of the N number of zones if the current raw value is greater than a first starting value of the first zone and smaller than a first starting value of a second zone. Furthermore, the method includes generating a basis-point calibrated value of said selected device parameter based on the current raw value using the N-spline function in the first zone. The method further includes performing a multi-linear interpolation based on the current set of values and multiple sets of the plurality of sets of values of the one or more secondary parameters for the first zone to calculate a first adjustment multiplier. The method then includes performing a multi-linear interpolation based on the current set of values and alternative multiple sets of the plurality of sets of values of the one or more secondary parameters for the second zone to calculate a second adjustment multiplier. Furthermore, the method includes interpolating between the first adjustment multiplier and the second adjustment multiplier to obtain a final multiplier. Moreover, the method includes multiplying the final multiplier to the basis-point calibrated value to obtain a final calibrated value of the selected device parameter to be communicated to the host.

In yet another specific embodiment, the present invention provides a method for calibration of an optical module. The method includes determining a device parameter of said optical module to be calibrated against a selected primary parameter. The optical module includes a microprocessor with non-volatile memory capable of measuring raw values of the selected primary parameter at all operation conditions with adjustments of one or more secondary parameters. The method includes determining a multi-zone calibration function of the device parameter against incrementally sorted raw values of the selected primary parameter in multiple zones by measuring calibrated values of the device parameter at multiple calibration points corresponding to the selected primary parameter being set to multiple raw values including at least a minimum value in each zone and the one or more secondary parameters being fixed to a set of basis-point values. Additionally, the method includes performing additional measurements of calibrated values of the device parameter at multiple calibration points corresponding to the one or more secondary parameters being adjusted to one or more sets of adjustment-point values away from the set of basis-point values and with the selected primary parameter being at least set to the minimum value in each zone to obtain a multiplicative factor for each set of values of the secondary parameters for each zone. The method further includes generating a basis-point calibrated value of the device parameter by using the multi-zone calibration function in a current zone of the multiple zones found for a current raw value of the primary parameter with the one or more secondary parameters being at a current set of values. Furthermore, the method includes performing multi-linear interpolation of multiple multiplicative factors based on the current set of values and multiple sets of adjustment-point values in both the current zone and a next higher zone to calculate a multiplier. Moreover, the method includes multiplying the multiplier to the basis-point calibrated value to deliver a final calibrated value of the device parameter communicated with a host.

In an alternative embodiment, the present invention provides a system for calibrating a selected device parameter of an optical module for communicating a calibrated value to a host. The system includes an optical module including an internal logic control unit with non-volatile memory, an Analog and Digital communication unit configured to control all internal optical devices for measuring raw values for a selected primary parameter sorted in multiple zones at all operation conditions including adjustments of one or more secondary parameters, a software embedded in the internal logic control unit for executing a calibration operation of the selected device parameter to deduce a calibrated value in any current operation condition using both a multi-zone N-spline function of the selected primary parameter in each of the multiple zones and a multiplier associated with the one or more secondary parameters for each zone stored in the non-volatile memory, and a data communication interface configured to report the calibrated value. Additionally, the system includes a calibration station including equipment to adjust the one or more secondary parameter, a test data communication bus connecting the host to one or more pre-calibrated measurement equipments configured to provide calibrated measurements of the selected device parameter, a test data generation block for data communication between the optical module and the host, a computer loaded with a calibration software for assisting measurements of each primary parameter and the one or more secondary parameters, performing logic operation in defining the multiple zones, sorting measurement data in each zone, calculating coefficients for generating the N-spline function for the multiple zones, deducing multiple multiplicative factors for multiple value vertices of the one or more secondary parameters for each zone, storing at least the coefficients for generating the multi-zone N-spline function and multiple multiplicative factors into the non-volatile memory of the optical module via I2C communication interface or other digital communication system. In an embodiment, the calibrated value for the selected device parameter at any current operation condition is obtained by operating the internal logic control unit to calculate a basis-point calibrated value using the multi-zone N-spline function generated by the coefficients for at a particular zone of the primary parameter corresponding to the current operation condition, to calculate an adjustment multiplier by interpolating the multiple multiplicative factors with corresponding weights depended on the one or more secondary parameters at the current operation condition with respect to at least two calibration points, and to multiply the adjustment multiplier to the basis-point calibrated value.

The preferred calibration system and method provided in this application is applicable for general purpose device parameter calibration where the control logic can be fully coded before the devices within the optical module have been characterized. An embodiment of the present invention provides a multi-zone calibration system capable of adjusting more than one secondary parameters and interpolating multiple adjuster multipliers to obtain accurate calibrated result for any selected device parameter at any operation conditions. Embodiments of the present invention should be applicable for performing majority of possible calibrations of optical modules and other devices configured with a minimum of physical memory space and with a minimum of additional overhead at the time of calibration.

The present invention achieves these benefits and others in the context of known waveguide laser modulation technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 6 is an example data storage format used in the internal logic control unit in the optical module for calibration according to an embodiment of the present invention.

DETAILED DESCRIPTION OF THE INVENTION

The present invention relates to optical module calibration techniques. More particularly, the present invention provides a system and method for calibrating general purpose device parameter of an optical module. The calibration system and method are applied with control logic being fully coded in the optical module before being applied for the characterization of various devices within the optical module, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
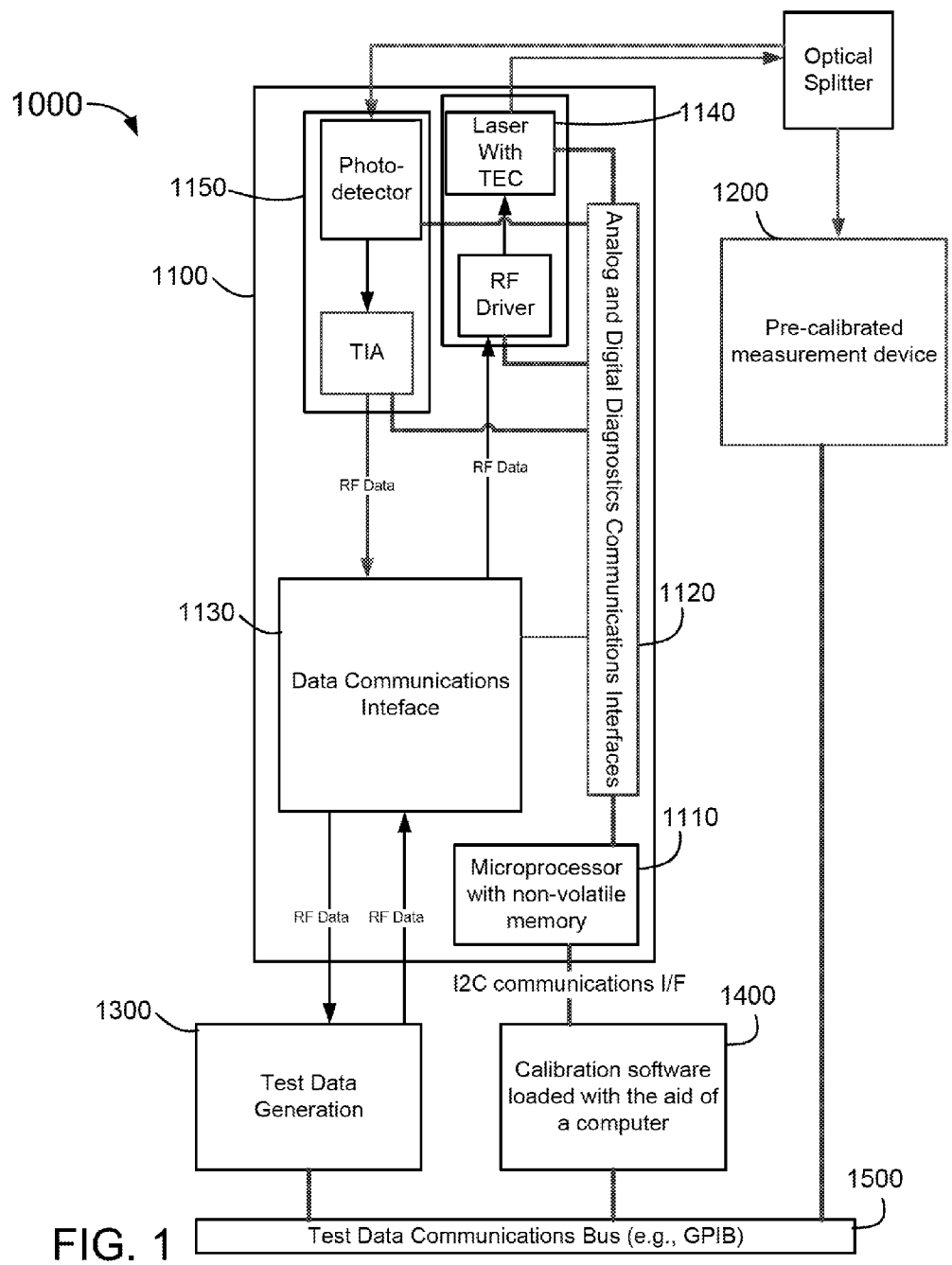
FIG. 1 is a simplified block diagram of a system for optical module calibration for communicating to a host according to an embodiment of the present invention.

FIG. 1 is a simplified block diagram of a system for optical module calibration for communicating to a host according to an embodiment of the present invention. This diagram is merely an example, which should not unduly limit the scope of the claims. One of ordinary skill in the art would recognize many variations, alternatives, and modifications. As shown, a calibration system 1000 includes an optical module 1100 containing a microprocessor 1110 or other logical control system with non-volatile memory, an analog and digital communication interface 1120 coupled to the microprocessor 1110 and several internal optical devices including an optical transmit circuitry 1140 comprising laser with TEC and RF driver, an optical receive circuitry 1150 comprising photo detector and TIA device, and a multi-channel mux/demux device (not specifically shown). Also the optical module 1100 includes a data communication interface 1130 configured to couple to both the optical transmit circuitry 1140 and optical receive circuitry 1150 and to an external test data generation block 1300 (as an outside host).

The microprocessor 1110 is preloaded or encoded with software configured for the optical module calibration. In an embodiment, it contains calibration control logic with command that can be passed via the analog and digital communication interface 1120 to the corresponding internal optical devices for measuring raw values of any selected parameters. The measurement results can be stored at least temporarily in the non-volatile memory of the microprocessor 1120 and reported to a host computer (for example, in a calibration station) via I2C communication interface or other digital communication system and used for calibrating a device parameter selected for communicating to a host. The software embedded in the microprocessor 1120 is configured to execute a calibration method disclosed in this application with description throughout the specification. Briefly, the calibration method includes generating a multi-zone N-spline function of the selected primary parameter in each zone to deduce a basis-point calibration value of a device parameter selected for calibration and determining a multiplier associated with the one or more secondary parameters for the basis point and at least another calibration point for each zone. The final calibrated value can be obtained by multiplying the determined multiplier and communicated to the host computer via the I2C communication interface or other digital communication system and a data communication interface configured to report the calibrated value operation to deduce a calibrated value in each calibration point.

In a specific embodiment, the calibration system includes a calibration station comprising a pre-calibrated measurement equipment 1200, a computer 1400 loaded with a calibration software and a test data generation block 1300 all coupled to a test data communication bus 1500 for communicating with external host. The calibration station is configured to adjust environmental conditions, e.g., temperature and voltage, which are used as typical secondary parameters for performing the calibration operation at a plurality of calibration points. The pre-calibrated measurement equipment 1200 is configured to provide calibrated measurements for the selected device parameter of the optical module via an optical splitter to couple with the mux/demux device of the optical module 1100 at the plurality of calibration points. The calibration software is loaded with the aid of the computer 1400 for assisting parameter (primary and secondary) adjustment and measurements of the primary/secondary parameters (by provide command instruction to the microprocessor 1110 in the optical module 1100. The calibration software also performs logic operation in defining zones for the selected primary parameter, sorting data in each zone, assigning different polynomials for each zone based on its influential behavior to the to-be-calibrated device parameter. Additionally, in the computer 1200, all calibration calculations are performed to generate the multi-zone N-spline function coefficients for deducing a basis-point calibrated value and multiple multiplicative factors associated with multiple vertices of the secondary parameter values for each zone. Furthermore, the computer 1200 communicates the microprocessor 1110 via I2C communication interface or other digital communication system to store the calculated calibration results into the non-volatile memory of the optical module.

Figure 2:
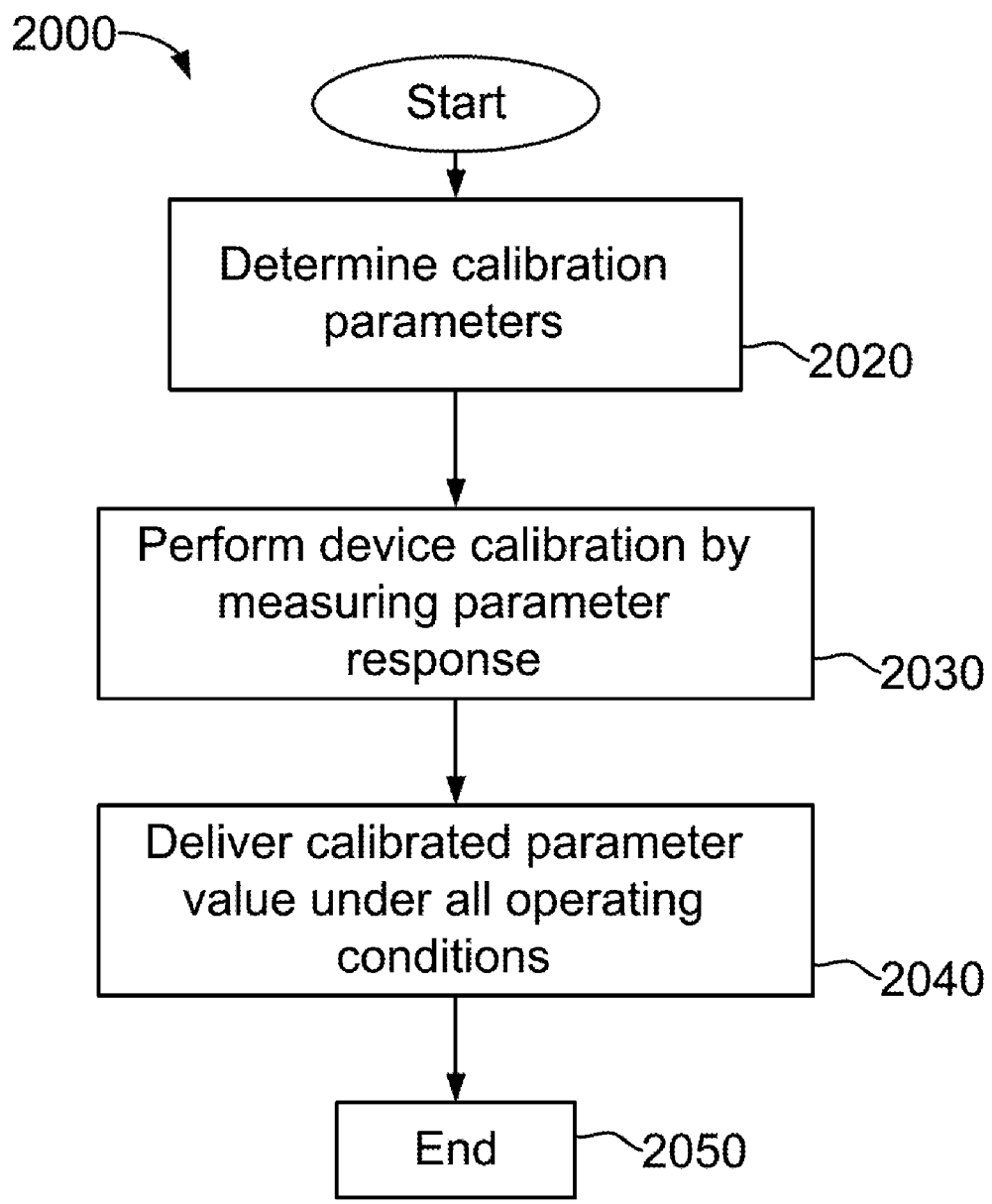
FIG. 2 is a simplified flow of a method of performing optical module calibration according to an embodiment of the present invention.

FIG. 2 is a simplified flow of a method of performing optical module calibration according to an embodiment of the present invention. This diagram is merely an example, which should not unduly limit the scope of the claims. One of ordinary skill in the art would recognize many variations, alternatives, and modifications. As shown, the method 2000 of performing optical module calibration starts with a step 2020 of determining calibration parameters. This step includes determining which device parameter is selected for calibration against which one or more other device parameters or environmental parameters.

In an embodiment, the device parameter of the optical module selected for calibration includes optical power including internally generated power from a laser source and externally transmitted or received power, optical modulation amplitude for both transmitted and received signal, laser frequency/wavelength per channel and wavelength shift from a target value, module temperature, power supply voltage, optical bias current, and thermo-electric cooler current. Among all these parameters, at least one is also selected to be a primary parameter for calibration the selected device parameter. In a specific embodiment, the primary parameter can even be the same as the target device parameter for calibration. In general the primary parameter is selected for it is believed to have a major influence to the device parameter so that the calibration of the device parameter is meaningful. In another specific embodiment, determining the primary parameter includes determining a number of zones in terms of its value over entire range for the operation of the optical module. This step can be done based on common knowledge or empirical measurements of raw values of the selected primary parameter during actual calibration process. The number of zones determined is different from a primary parameter to another and may also be different for a same primary parameter but when a different device parameter is selected for calibration, all dependent on the response behavior of the device parameter upon the selected primary parameter.

Any calibrated parameter will have a raw value and a calibrated value. The relationship between these two values may be complex. It is possible that multiple raw values may be combined to produce a single calibrated value. For the simplest case, where a single raw value leads to a calibrated value, the behavior may be complex. At low values of the raw parameter the relationship may be quite different vs. at high values of the raw parameter. To accommodate this, the raw value is split up among various zones. A zone is a section of the curve converting the raw value to a calibrated value.

The reason to determine multiple zones for the primary parameter is to provide more accurate calibration of the device parameter by assigning different polynomial mapping function for different zone. If the number of zones is determined sufficiently well, each zone will contain a well behaved polynomial of a certain order. In most cases a $3^{rd}$ order polynomial would be sufficient, and in many cases a $1^{st}$ order polynomial would suffice. There is of course a trade-off between more zones and higher order polynomial to improve accuracy. For a more complex case, the zone may include more than one raw parameter. For the case of two raw parameters combining to form a single calibrated parameter, the calibrated result would be a surface. In general if N raw parameters are required, then an N-dimensional object will result.

In addition to whichever raw parameters are required to determine a calibrated result; there are often environmental conditions (e.g., system temperature or voltage) that affect the calibration. Usually, these effects are relatively small compared with the effect of the primary raw parameter(s). However, in order to generate a higher level of accuracy, these secondary effects must be taken into account. In another embodiment, the step 2020 also includes determining one or more secondary parameters that may cause perturbation to the selected device parameter at least providing different effects at different range of primary parameter. For example, a module temperature determined by the environment of the optical module may cause the selected device parameter to change with respect to the selected primary parameter quite differently at low temperature versus at high temperature. Although mainly those environmental parameters like temperature or operation power-supply voltage are selected to be the secondary parameters, theoretically all parameters mentioned above that are used as device parameter or primary parameter can also be selected as secondary parameters in certain calibration according to the present invention.

Further, the method 2000 includes a step 2030 for performing optical module calibration by measuring the parameter response. Specifically, the step 2030 includes performing a calibration process to determine the mapping function to get the calibrated result. This process requires a calibrated measuring equipment to measure the selected device parameter at various raw values of the primary parameters and at different calibration points associated with varied secondary parameter values. The measurements of the raw values of the primary parameters are carried by the optical module. The variation of the secondary parameter can be done using equipment in a calibration station designated for calibrating the optical module. In an embodiment, a plurality of measurements on the raw values of the primary parameter in each determined zone includes at least the measurement of a starting minimum raw value in each zone with the secondary parameters being set at a typical (or selected as basis point) calibration point.

In another embodiment, the plurality of measurements on the raw values at least should be sufficient for determining all coefficients for constructing the polynomial function of certain order in corresponding zone. For a simple one primary parameter case, the polynomial function is a 1-dimensional function. An order n (n≥0) polynomial function needs n+1 coefficients. For more complex case with two primary parameters, a 2-dimensional polynomial function needs to be constructed with potentially more coefficients to be determined by performing more raw-value measurements.

In an alternative embodiment, performing measurements of the secondary parameter values in step 2030 include setting the basis point as well as at least one more alternate calibration point, along with the measurement of primary parameter at the starting minimum raw value in each zone (by the optical module) and a corresponding measurement of calibrated value of the selected device parameter against this starting minimum raw value (by the pre-calibrated measurement equipment). The secondary parameter is adjusted by the calibration station where the optical module is disposed for calibration. Typically, by common sense, the adjustment of the secondary parameter is intended to cover the widest range of the secondary parameter itself during the operation of the optical module by design so that the affection of the secondary parameters on the calibration of the selected device parameter can be taken account with full extent.

In the present invention, the secondary effects are handled by including them as a multiplicative factor onto the primary result. One or more secondary parameters may have an impact on the calibration. The multiplicative factor must be determined by performing the device calibration at various environmental points in addition at the zone calibration points. The multiplicative factor may itself be a complex function of these one or more secondary parameters. The algorithm handles this by employing a multi-stage interpolation process to determine the most appropriate multiplier to use together with the primary calibration function response. In a specific embodiment, the measurements of the secondary parameters at various calibration points are performed for each zone of primary parameter to provide a multiplicative factor per each value vertex of the secondary parameters at each calibration point. In general, for one secondary parameter, at least two vertices (i.e., two separate values) are needed; for two secondary parameters, at least four vertices (of four calibration points) are needed; for M number of secondary parameters, at least $2^M$ vertices (of four calibration points) are needed for correspondingly determining $2^M$ number of multiplicative factors for each zone.

Further, the method 2000 includes a step 2040 of delivering calibrated parameter value for all operation conditions of the optical module. Once the multi-zone mapping function is determined by the coefficients of corresponding polynomials in respective zones, the data including these coefficients, all multiplicative factors, and all values of secondary parameters at various calibration points for each zone of the primary parameter can be saved into a non-volatile memory in a microprocessor or other logic control unit of the optical module. The microprocessor can execute an embedded software code to use the saved coefficients to construct a mapping function for a particular zone based on any current raw value of the primary parameter measured by the optical module at any current operation condition to calculate a basis-point calibrated value of the device parameter. Additionally, the current secondary parameter values (corresponding to the current operation condition) can be used to perform an interpolation operation utilizing the stored multiplicative factors and all secondary parameter values at corresponding calibration points for the particular zone to calculate a final multiplier representing all the effect of the secondary parameter at current operation condition on the calibrated value of the device parameter. The method ends at step 2050, wherein the calibrated value may be communicated to an external host of the optical module.

Figure 3:
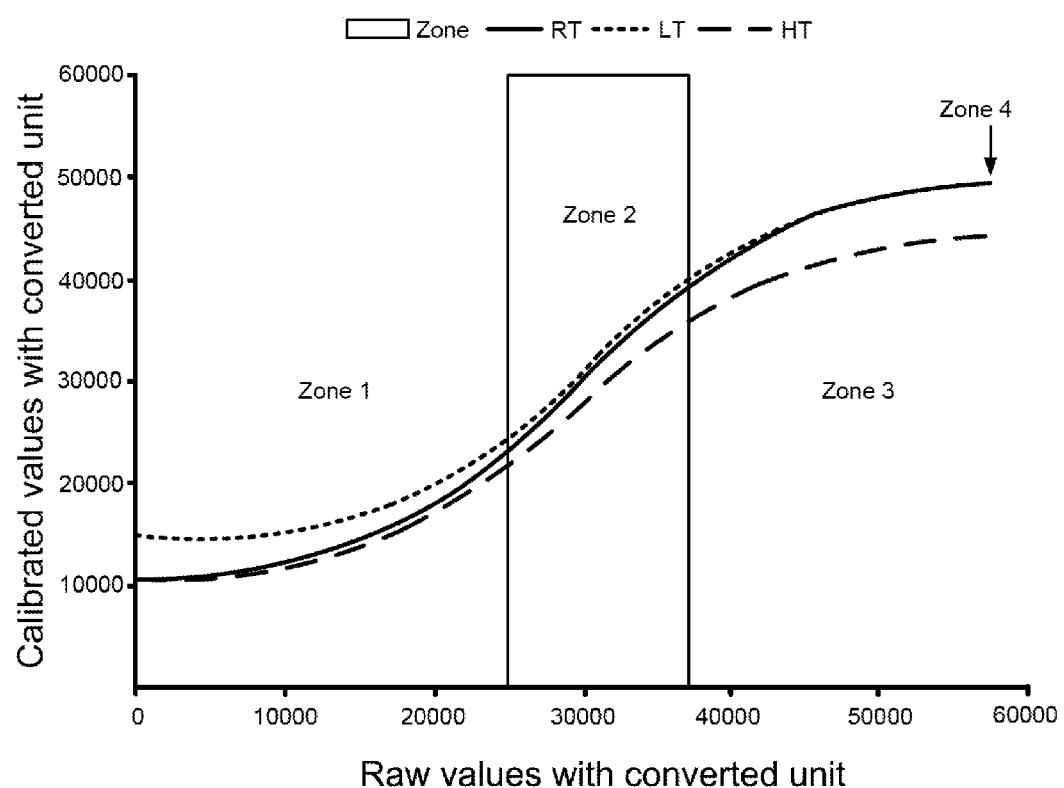
FIG. 3 is an exemplary diagram for mapping raw values to calibrated values with a high/low temperature effect over three zones according to an embodiment of the present invention.

FIG. 3 is an exemplary diagram for mapping raw values to calibrated values with a high/low temperature effect over three zones according to an embodiment of the present invention. This diagram is merely an example, which should not unduly limit the scope of the claims. One of ordinary skill in the art would recognize many variations, alternatives, and modifications. As shown, a primary parameter with an S-shaped conversion from raw values to calibrated values, with a high temperature effect at low values and a low temperature affect at high values. Note, all calibrated values and raw values plotted in the graph of FIG. 3 have been converted to a proper numerical unit from original measurement data with different physical units. There are three clear zones of behavior with the center zone, marked as a box, being relatively linear and the two outside zones (not marked) could be represented by a cubic polynomial function. In addition, the secondary affects must also be taken into account and are different in the three zones. In the first zone to the left, the effect of low value(s) of the secondary parameter (the temperature in this example) on the calibrated values is substantially negligible. But the effect of high value(s) of the secondary parameter on the calibrated values is quite strong, causing up to 50% increase in the calibrated value for the same raw value of the primary parameter. Contrary to that, in the third zone to the right, the effect of low value(s) of the secondary parameter on the calibrated values is strong. The example shows that using multiple zones for the calibration against the primary parameter also needs to handle the secondary parameter effects differently in different zone, which is achieved by embodiments of the present invention.

In the example, although there are 3 zones of interest, a $4^{th}$ zone is named theoretically to merely provide a maximum value of the primary parameter. In this graph, the raw value of the primary parameter is plotted in a sorted order from smaller value to larger value. Although the real situation could be more complex, the calibrated values in this example are also increased accordingly. Based on the response behavior, different mapping polynomial function of certain order may be assigned for each zone. In Zone 1, the starting point of raw value is 0 with a polynomial function of order 3 being assigned. The temperature is selected to be a secondary parameter with at least two measurement points: 25 and 70 (° C.). In Zone 2, the starting point of raw value is 25000 with a polynomial of order 1 being assigned. The secondary parameter, temperature, is measured at 0, 25, and 70. In Zone 3, the starting point is 37500. Polynomial function of order 3 is assigned and the secondary parameter measurement points are 0 and 25. Zone 4 is merely a single point, also a starting point, at 57600 as a constant so a polynomial of order 0 is provided. Again, the secondary parameter measurement points include 0 and 25.

Figure 4:
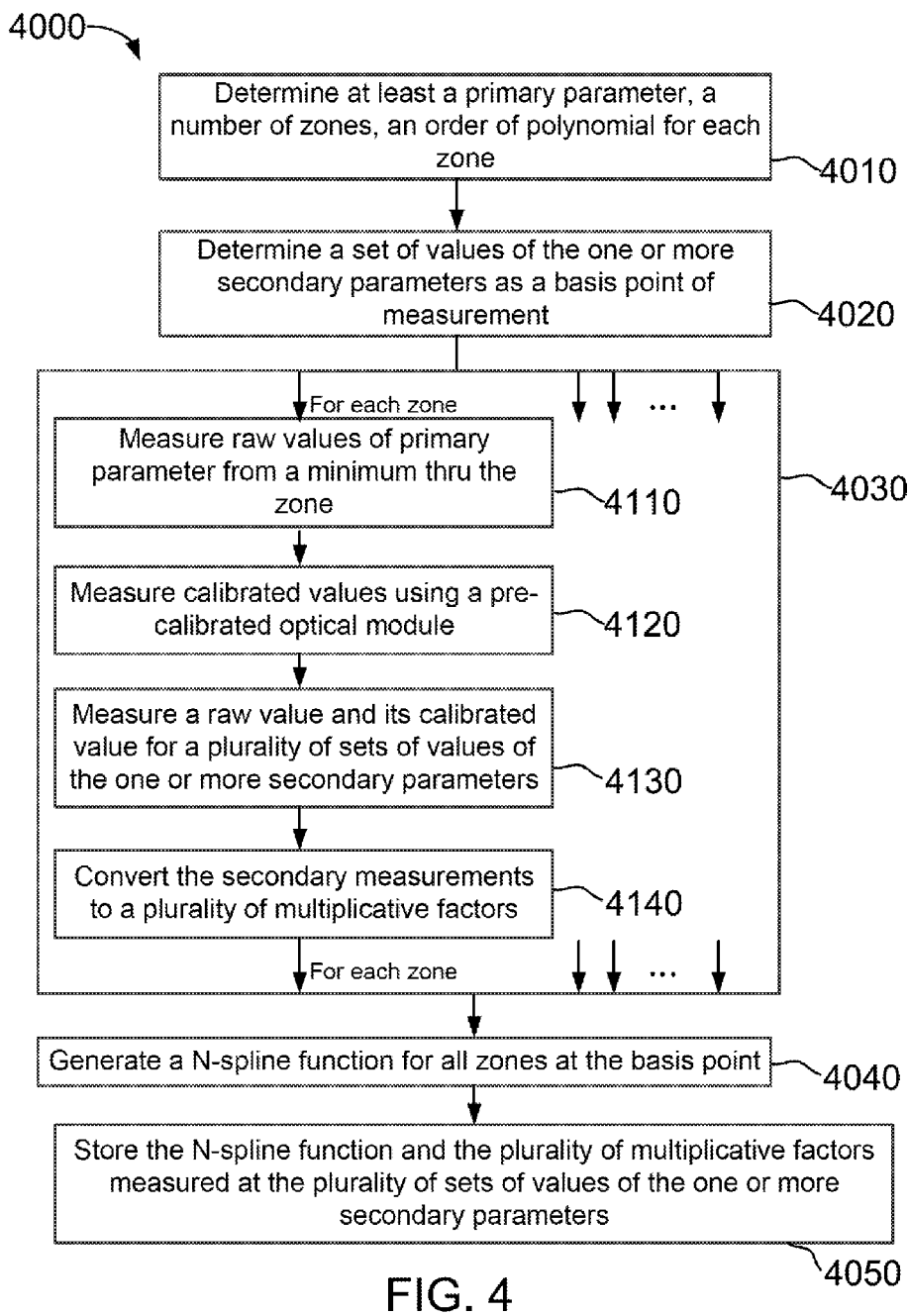
FIG. 4 is a simplified flowchart of a method for performing optical module calibration by measuring and saving calibration data according to an embodiment of the present invention.

FIG. 4 is a simplified flowchart of a method for performing optical module calibration by measuring and saving calibration data according to an embodiment of the present invention. This diagram is merely an example, which should not unduly limit the scope of the claims. One of ordinary skill in the art would recognize many variations, alternatives, and modifications. As shown, the method 4000 for performing optical module calibration starts with a step 4010 of determining at least a primary parameter, a number of zones, and an order of polynomial for each zone. This step is substantially similar to the step 2020 of the method 2000 disclosed in FIG. 2 of this specification. For multiple primary parameters, each primary parameter is determined to be split to different number of zones depending on its nature and relationship with the device parameter selected for calibration. In each zone, a 2-dimensional polynomial function is provided to be determined as a mapping function of the zone. This step also includes determining one or more secondary parameters for dealing their affections on the device parameter selected for calibration. This step is followed by a step 4020 for determining a set of values of the one or more secondary parameters as a basis point for the calibration measurements.

Once the list of parameters, the number of multiple zones, and the order of the polynomials for each zone is determined, a calibration process is run to determine the mapping function to get the calibrated result for the selected device parameter of the optical module. This process requires a calibrated measuring equipment to measure the calibrated value of the selected device parameter against each raw value of the primary parameter measured by the optical module. The method 4000 moves to a step 4030 of performing calibration measurements for each of the multiple zones. The operation for each zone can be performed in parallel or in series depending on the layout of calibration station with a pre-calibrated measurement equipment and corresponding calibration software loaded with the computer associated with the calibration station as well as coded in a microprocessor or other logic control unit of the optical module.

For each zone, the calibration measurement is performed in a series of steps starting with a step 4110 of measuring raw values of the primary parameter from a minimum through a selected zone. In the step 4110, raw values of the primary parameter in the selected zone is firstly measured by the optical module with the one or more secondary parameters being set at corresponding values selected as a basis point. In particular, multiple raw values are selected in different measurements including at least a starting minimum value in the selected zone. In an embodiment, the measurements of raw values of the primary parameter are done by internal optical devices of the optical module controlled via an analog/digital communication interface using a control logic loaded in the microprocessor or the logic control unit. The number of raw value measurements depends on a target mapping function assigned for the selected zone. In order to determine all n+1 coefficients required for constructing a n-order polynomial function assigned for a particular zone, n+1 number of measurements are at least performed, where n>0. Other than the minimum value of the selected zone is measured, a minimum value of next higher zone is also selected for measuring. One or more intermediate raw values are then selected depending on specific zone with corresponding polynomial function.

Following the step 4110 for each raw value measurement, a step 4120 is performed to measure calibrated values of the device parameter by the pre-calibrated measurement equipment. After each measurement of the raw value and corresponding calibrated value, a unit conversion is performed to convert either the measured raw value or the calibrated value from its original physical unit to a pure numerical unit for all subsequent calibration calculations. Combining all measurement data from step 4110 and step 4120, all coefficients for constructing a mapping polynomial function of the selected zone can be deduced, with the one or more secondary parameters being set at corresponding values selected as a basis point.

Additionally in step 4130, for each selected zone, more measurements on the calibrated values of the device parameter are performed corresponding to the raw value at the minimum value of the selected zone but with the one or more secondary parameters being adjusted to different values corresponding to one or more calibration points alternate to the basis point. Following each step 4130, another step 4140 is performed to convert the measured calibrated values in step 4130 to a multiplicative factor by taking ratio of the calibrated value at each alternate calibration point over the calibrated value at the basis point (obtained in step 4120). Depending on the number of secondary parameters used for the calibration, a minimum number of measurements in step 4130 at different calibration points (plus the one for the basis point) is needed so that a multiple multiplicative factor are obtained corresponding to each calibration point. Namely, at the basis point, the multiplicative factor is 1. At other calibration points, the multiplicative can be greater or smaller than 1.

In an embodiment, after completing all measurements and calculations in the step 4030 for each zone of the multiple zones, the method 4000 moves to next step 4040 of generating a N-spline function for mapping the calibrated value against the primary parameter for all zones corresponding to a basis point of the one or more secondary parameters. In particular, the N-spline function is a multi-sectional continuous function that combines all polynomial functions in corresponding zones with some restrictions imposed. For example, for a zone with a polynomial of order n=1, this will be a piecewise linear curve to simply connect with a function of next zone. For a zone with a polynomial function of order n=3, this will be a cubic spline. The connection with next zone needs to set respective 1st and 2nd derivative to be constant at zone boundaries in addition to the connection of the two boundary points which is essentially one point because the maximum value point of the selected zone actually is the minimum value point of next higher zone.

In a specific embodiment, for the first and last zone, special consideration may be needed to determine the best coefficients. In addition, if higher-order (n>1) polynomials are used, and then intermediate points within the zone will be needed to determine the correct coefficients for constructing the order n polynomial function. Finally, additional intermediate points may be used to provide a statistical determination of the coefficients (using a polynomial fitting algorithm, such as a least squares fit). Note that the last zone may require additional calibration points if it has order >0.

In a specific embodiment, the first waveguide 373 in the integrated two-channel spectral combiner and wavelength locker 350 is made longer than the second waveguide 374 by a predetermined length which provides a delayed phase shift to the optical signals traveling in the first waveguide 373. In other words, a delay-line interferometer is formed with the two waveguide paths having different lengths. When the two halves of optical signals (having the same wavelength) meet again in the output MIMI coupler 342, this delayed phase shift, if properly tuned, would lead to an interference spectrum with enhanced passbands at particular phases. This applies to both optical signals $\lambda 1$ and $\lambda 2$.

Table 1 shows an example of measurements of calibrated values against a primary parameter from corresponding minimum value in each of 4 zones and at several calibration points including a basis point of a secondary parameter. This table is based on the exemplary relationship between the calibrated value and the raw value shown in FIG. 3.

TABLE 1

| Zone | Raw starting point | Secondary parameter point value | Unit-converted Calibrated Value |
|---|---|---|---|
| 1 | 0 | 25 | 10543 |
| 1 | 0 | 70 | 14760 |
| 2 | 25000 | 0 | 22230 |
| 2 | 25000 | 25 | 23399 |
| 2 | 25000 | 70 | 24569 |
| 3 | 37500 | 0 | 35520 |
| 3 | 37500 | 25 | 39467 |
| 4 | 57600 | 0 | 44315 |
| 4 | 57600 | 25 | 49239 |

Based on Table 1 and the method 4000 of FIG. 4, multipliers associated with several adjustment points for each zone are generated and shown in Table 2 below.

TABLE 2

| Zone | Secondary parameter point value | Multiplier | Determined by |
|---|---|---|---|
| 1 | 25 | 1 | Basis point |
| 1 | 70 | 1.40 | Zone 1 70 C/Zone 1 25 C |
| 2 | 0 | 0.95 | Zone 2 0 C/Zone 2 25 C |
| 2 | 25 | 1 | Basis point |
| 2 | 70 | 1.05 | Zone 2 70 C/Zone 2 25 C |
| 3 | 0 | 0.90 | Zone 3 0 C/Zone 3 25 C |
| 3 | 25 | 1 | Basis point |
| 4 | 0 | 0.90 | Zone 4 0 C/Zone 4 25 C |
| 4 | 25 | 1 | Basis point |

Finally, based on the Table 1 and Table 2 above, all the polynomial coefficients at the basis point (25 C) for each zone can be generated using the method 4000 proposed in FIG. 4. The results are shown below in Table 3 with the determination detail methodology shown in last column.

TABLE 3

| Zone | Coef. # | Coef. Value | Determined by: |
|---|---|---|---|
| 1 | 0 | 10543 | Cubic calculated from 4 equations: |
| 1 | 1 | 0.12864 | y" (zone 1 raw start) = 0 |
| 1 | 2 | 0 | y' (zone 2 raw start) = y' (zone 2 linear calculation below) |
| 1 | 3 | 6.1696E−10 | (x1, y1) = zone 1 raw start, zone 1 raw start 25 C calibrated value (x2, y2) = zone 2 raw start, zone 2 raw start 25 C calibrated value |
| 2 | 0 | −8737 | Line calculated from 2 points: |
| 2 | 1 | 1.285 | (x1, y1) = zone 2 raw start, zone 2 raw start 25 C calibrated value (x2, y2) = zone 3 raw start, zone 3 raw start 25 C calibrated value |
| 3 | 0 | −122066.88 | Cubic calculated from 4 equations: |
| 3 | 1 | 8.32641365 | Y" (zone 4 raw start) = 0 |
| 3 | 2 | −0.0001337 | y' (zone 3 raw start) = y' (zone 2 linear calculation above) |
| 3 | 3 | 7.0877E−10 | (x1, y1) = zone 3 raw start, zone 3 raw start 25 C calibrated value (x2, y2) = zone 4 raw start, zone 4 raw start 25 C calibrated value |
| 4 | 0 | 49239 | y0 = zone 4 raw start 25 C calibrated value |

Note:
y" is $2^{nd}$ derivative quantity, y' is $1^{st}$ derivative quantity, y0 is constant.

The data in the tables above are stored into non-volatile memory of the device under test to be used during operation to provide a calibrated result. The data must be sorted such that the lower raw values are stored first in the memory and the secondary parameters must always be presented in the same order. A storage structure stored in the internal logic control unit is proposed as an example below in FIG. 6, which is sufficiently self-explanatory.

Figure 5:
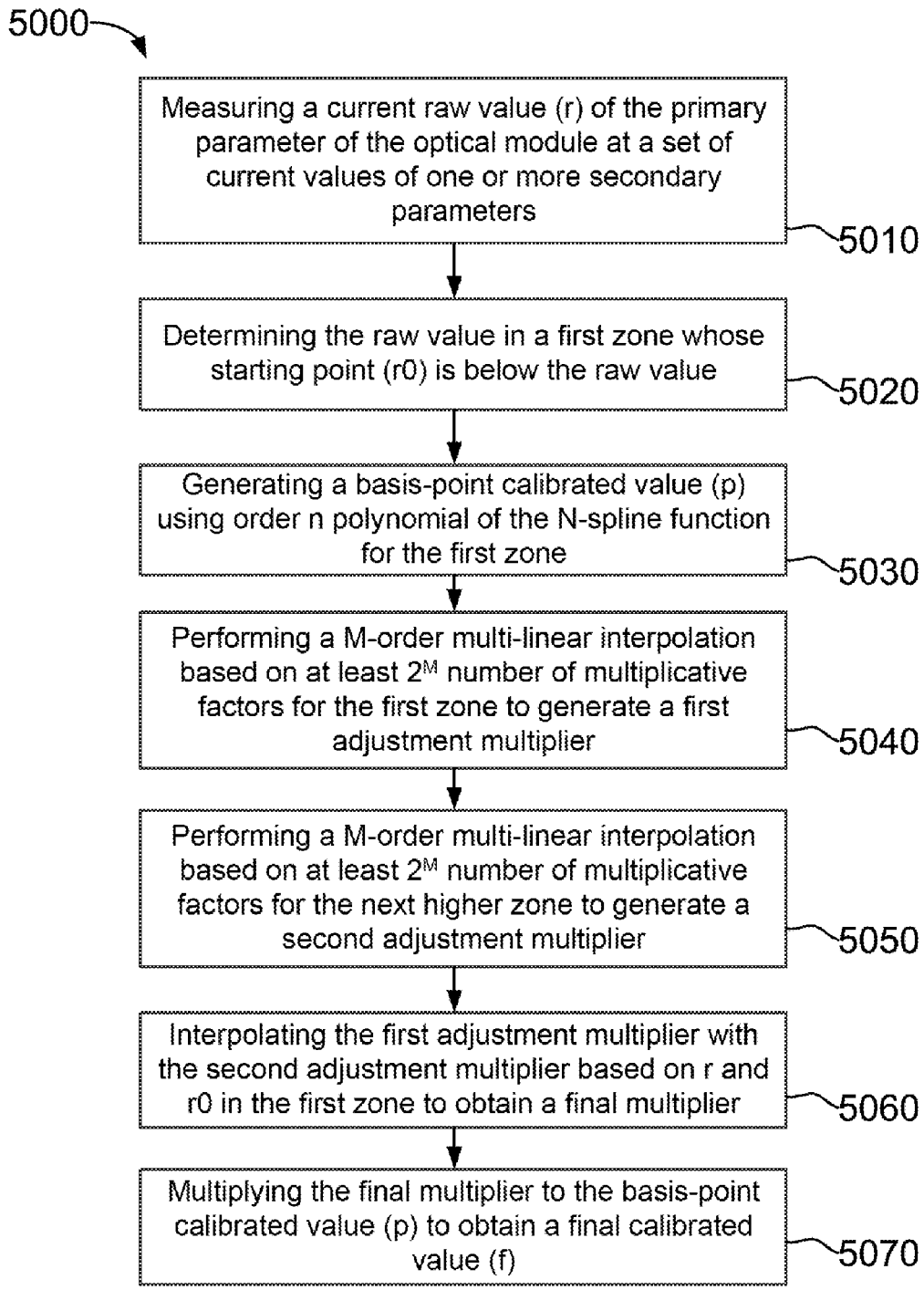
FIG. 5 is a simplified flowchart of a method for performing optical calibration by using calibration data to deliver calibrated parameter according to an embodiment of the present invention.

FIG. 5 is a simplified flowchart of a method for performing optical calibration by using calibration data to deliver calibrated parameter according to an embodiment of the present invention. This diagram is merely an example, which should not unduly limit the scope of the claims. One of ordinary skill in the art would recognize many variations, alternatives, and modifications. As shown, a method 5000 for performing optical calibration by using calibration data to deliver calibrated parameter is performed on an arbitrary operation condition of the optical module. The method 5000 starts with step 5010 of measuring a current raw value (r) of the primary parameter of the optical module at a set of current values of one or more secondary parameters. The current raw value of the primary parameter and the current set of values of the one or more secondary parameters are part of the current operation condition measured by the optical module. Based on the measured current raw value in step 5010, step 5020 is to determine the currently measured raw value in one particular zone of multiple zones (e.g., the multiple zones determined in step 4010 of method 4000). In an embodiment, if the starting point (r0) of the particular zone is below the currently measured raw value, the current raw value belongs to the particular zone. For the convenience of description, the particular zone is the first zone.

In an embodiment, the method 5000 is executed within the optical module itself including a microprocessor or other logic control system programmed with a calibration software based on a multi-zone N-spline mapping function defined by the method 4000 with all coefficients stored in an associated non-volatile memory along with all multiplicative factors and all sets of values of the secondary parameters corresponding to various calibration points. Therefore, the method 5000 moves to step 5030 to use a particular order n polynomial function corresponding to the particular zone determined in step 5020 to calculate a basis-point calibrated value. This is done by simply substituting the current raw value into the order n polynomial functions constructed by the stored coefficients. For example, the basis-point calibrated value (p) is obtained using the N polynomial coefficients ($C_n$) for the matching zone:

$$p = \sum_{n=0}^{N} C_n r^n$$

In an specific embodiment, the non-volatile memory of the microprocessor in the optical module is also configured to save all the multiplicative factors obtained during a plurality of calibration measurements on the optical module, per each zone of primary parameter, at corresponding various calibration points with the one or more secondary parameters being at the various sets of values. In next step 5040 of the method 5000, these data stored in the non-volatile memory will be utilized for performing a multi-linear interpolation calculation for the particular zone (determined in step 5020) on the multiple multiplicative factors to deduce a multiplier for the zone. The interpolation calculation is based on the secondary parameter values at the current operation condition with respect to the corresponding sets of values associated with the determination of the multiple multiplicative factors at corresponding multiple calibration points (e.g., performed in step 4140 of method 4000) for the particular zone.

Each secondary parameter corresponds to an adjuster (for the calibration of the device parameter). Each adjuster will have a current value determined by current measurement, as well as a set of measurement values determined at corresponding calibration points (e.g., when performing step 4140). For each adjuster, if the current value lies between two measurement values corresponding to two calibration points then those two points can be used as vertices in the multi-linear interpolation. If the current value lies below the lowest or above the highest measurement values then there are two options: 1) assume a constant value (i.e., extend the lowest/highest value), or 2) assume a linear continuation of the highest/lowest two points. In either case, for each adjuster there will be two interpolation points. For each vertex of interpolation points a multiplicative factor M is associated with.

With a single adjuster, this is reduced to a simple linear interpolation of the measured secondary parameter value (A) between the two measurements corresponding to two calibration points $(A_0, A_1)$ respective associated with two multiplicative factors $M(A_0)$ and $M(A_{14})$, leading to an adjustment multiplier $m_0$ for the particular zone:

$$m_0 = \frac{(A_1 - A)M(A_0) + (A - A_0)M(A_1)}{(A_1 - A_0)}$$

With two adjusters, then there will be 4 vertices: $\{A_0, B_0\}$, $\{A_1, B_0\}$, $\{A_0, B_1\}$ and $\{A_1, B_1\}$ each vertex having a multiplicative factor M. The current value of parameter A and B can be described as a vector with the value $\{A, B\}$. In this case, a rectangular interpolation is used to lead to an adjustment multiplier $m_0$ for the particular zone, as follows:

$$m_0 = \frac{(A_1 - A)(B_1 - B)M(A_0, B_0) + (A - A_0)(B_1 - B)M(A_1, B_0) + (A_1 - A)(B - B_0)M(A_0, B_1) + (A - A_0)(B - B_0)M(A_1, B_1)}{(A_1 - A_0)(B_1 - B_0)}$$

For higher orders, an N-order multi-linear interpolation is calculated by taking a weighted average of the multiplicative factors Mat the $2^N$ vertices. The weights are determined via a geometric conception where the weight of a particular vertex is proportional to the geometric N-volume of the region bounded by the current parameter value vector and the diametrically opposite vertex, expressed as a fraction of the total N-volume bounded by all the vertices. For performing the above interpolation calculations, the data storage requirements in the non-volatile memory of the microprocessor should be capable of storing all secondary adjusters associated with each zone of the primary parameter, including values of all secondary parameters in all calibration points and all multiplicative factors deduced at all calibration points. For example, with 4 adjusters having 3, 5, 7, and 2 calibration points respectively, there will be 3+5+7+2=17 total measurement values and additional 3×5×7×2=210 total multiplicative factors stored in the non-volatile memory of the optical module.

In another embodiment, the method 5000 moves to step 5050, if the current raw value is not falling into the last zone with the highest value, to perform another a multi-linear interpolation calculation for a next higher zone (determined in step 5020) on the multiple multiplicative factors to deduce a multiplier for that zone. The interpolation calculation is based on the secondary parameter values at the current operation condition with respect to the corresponding sets of values associated with the determination of the multiple multiplicative factors at multiple corresponding calibration points (e.g., performed in step 4140 of method 4000) for the particular zone. In the end, another adjustment multiplier $m_1$ is obtained for the next higher zone.

Referring to FIG. 5, the method 5000 now includes a step 5060 to interpolate the results in both step 5040 and step 5050. Once the adjustment multiplier $(m_0)$ has been calculated for the particular matching zone, and also for the next higher zone $(m_1)$, the resulting pair of adjustment multipliers is used to do a final interpolation along the axis of the original raw parameter (r) to determine a final multiplier m:

$$m = m_0 + \frac{m_1 - m_0}{r_1 - r_0}(r - r_0)$$

The method 5000 includes a step 5070 for multiplying the final multiplier m to the basis-point calibrated value (p) to obtain a final calibrated value (f) of the device parameter of the optical module:

$$f = mp$$

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A system for performing calibration of a device parameter of an optical module, the system comprising: setting up a calibration system, the calibration system comprising: an optical module comprising an internal logic control unit with non-volatile memory and an Analog and Digital communication unit configured to control all internal optical devices to obtain raw values of a selected primary parameter sorted in N(N>1) zones at all operation conditions including adjustments of one or more secondary parameters, a software embedded in the internal logic control unit for executing calibration operation of the selected device parameter to deduce a calibrated value in any current operation condition using both a N-spline function of the selected primary parameter in each of the N zones and an adjustment multiplier associated with the one or more secondary parameters for each zone stored in the non-volatile memory, and a data communication interface configured to report the calibrated value; a calibration station comprising equipment to adjust the one or more secondary parameter, a test data communication bus connecting a host to one or more pre-calibrated measurement equipments configured to provide calibrated measurements of the selected device parameter, a test data generation block for data communication between the optical module and the host, a computer loaded with calibration software for assisting measurements of the selected primary parameter and the one or more secondary parameters, performing logic operation in defining the N zones, sorting measurement data in each zone, calculating coefficients for generating the N-spline function for the N zones, deducing multiple multiplicative factors for multiple value vertices of the one or more secondary parameters for each zone, storing at least the coefficients for generating the N-spline function and the multiple multiplicative factors into the non-volatile memory of the optical module via a digital communication interface; wherein the calibrated value for the selected device parameter at any current operation condition is obtained by operating the internal logic control unit to calculate a basis-point calibrated value using the N-spline function generated by the coefficients for at a particular zone of the selected primary parameter corresponding to the current operation condition, to calculate the adjustment multiplier by interpolating the multiple multiplicative factors with corresponding weights depended on the one or more secondary parameters at the current operation condition with respect to at least two calibration points, and to multiply the adjustment multiplier to the basis-point calibrated value; determining an order n of a polynomial function for each of the N zones wherein n>0 and is varied for the N zones; performing calibration measurements for each of the N zones.

2. The system of claim 1 wherein performing calibration measurements for each of the N zones comprises performing a first plurality of calibration measurements in the selected zone, with the one or more secondary parameters being set at corresponding values selected as a basis point, to obtain a plurality calibrated values of the device parameter measured by a pre-calibrated measurement equipment respectively against a plurality of raw values of the selected primary parameter in the selected zone measured by the optical module to deduce n+1 number of coefficients.

3. The system of claim 2 wherein performing calibration measurements for each of the N zones further comprises: performing a second plurality of calibration measurements respectively at second plurality of calibration points to generate a multiplicative factor of the selected zone for each calibration point; and storing the n+1 number of coefficients for constructing the order n polynomial function and the multiplicative factor associated with each of the second plurality of calibration points for the selected zone into the non-volatile memory.

4. The system of claim 1 further comprising generating the N-spline function for all N zones based on each order n polynomial function for each zone at the basis point, the N-spline function being programmed into the internal logic control unit for generating basis-point calibrated value of the device parameter for the optical module.

5. The system of claim 1 wherein the selected primary parameter is one of the plurality of primary parameters comprising optical power including internally generated power from a laser source and externally transmitted or received power, optical modulation amplitude for both transmitted and received signal, laser frequency/wavelength per channel and wavelength shift from a target value, module temperature, power supply voltage, optical bias current, and thermo-electric cooler current, among which the device parameter is selected for calibration against at least the selected primary parameter.

6. The system of claim 1 wherein the each of the one or more secondary parameters comprises at least module temperature and power supply voltage and is interchangeable with one of the plurality of primary parameters.

7. The system of claim 1 further comprising concurrently selecting at least second primary parameter determined with alternate multiple zones together with the selected primary parameter with the N zones for generating a multi-zone function for calculating a basis-point calibrated value of a single device parameter at all operation conditions against at least two primary parameters.

8. The system of claim 1 wherein the first plurality of calibration measurements for each zone comprises measurements of the corresponding calibrated values of the device parameter with the selected primary parameter at least being a starting minimum value in the selected zone and being a starting minimum value in a next higher zone with options of being one or more intermediate values in the selected zone to use a least squires fit for determining the n+1 coefficients.

9. The system of claim 1 wherein the second plurality of calibration measurements for each zone comprises measurements of the corresponding calibrated values of the device parameter measured by the pre-calibrated measurement equipment with the one or more secondary parameters at least being set once at the basis point at which the corresponding multiplicative factor is set to 1 and with the selected primary parameter at least being a starting minimum value in the selected zone.

10. The system of claim 1 wherein each calibration point corresponds to a set of values of the one or more secondary parameters, wherein among the second plurality of calibration points each of the one or more secondary parameters is adjusted by the calibration station with at least two different values including the correspond value at the basis point.

11. The system of claim 10 wherein the two different values are preferred to cover substantially wide operation range of the corresponding one secondary parameter in the optical module.

12. The system of claim 1 wherein deducing each of multiple multiplicative factors comprising taking ratio, after a necessary unit conversion, of a corresponding calibrated value measured by the pre-calibrated measurement equipment at the corresponding calibration point with respect to the calibrated value at the basis point.

13. The system of claim 1 wherein generating the N-spline function comprises connecting each order n polynomial function for each of the N zones by defining a boundary condition with all 1st through (N−1)th derivatives being equal at a boundary point between the selected zone and a next higher zone, the boundary point corresponding to a maximum raw value of the selected zone being equal with a minimum raw value of the next higher zone.

14. The system of claim 1 wherein the calibration station comprises at least a software loaded with the aid of a computer through a data communication interface, for each of the first plurality of calibration measurements for each zone, to assist adjustment and measurement of each raw value of the selected primary parameter, measurement of each calibrated value of the device parameter, and calculation of the n+1 coefficients for the order n polynomial function, and for each of the second plurality of calibration measurements for each zone, and to assist adjustment of each of the second plurality of calibration points, measurement of each set of values of the one or more secondary parameters, and conversion of each measured calibrated value to a numerical unit, and calculation of each multiplicative factor.

15. The system of claim 14 wherein the software comprises a plurality of computer executable instructions to save all types of data for each zone obtained during the first and second plurality of calibration measurements via the data communication interface to the non-volatile memory in the internal logic control unit, the all types of data for each zone including all raw values from the starting minimum value of the selected primary parameter, the calculated n+1 coefficients for constructing the polynomial function of order n, all multiplicative factors, and all sets of values of the one or more secondary parameters respectively at the second plurality of calibration points.

16. The system of claim 14 wherein the non-volatile memory comprises a data structure configured to sort each type of the all type from a lower value to a higher value.

17. A system of delivering a calibrated device parameter of an optical module from a calibration system to a host, the system comprising: coupling an calibration system to a host, the calibration system comprising: an optical module comprising an internal logic control unit with non-volatile memory and an Analog and Digital communication unit configured to control all internal optical devices to obtain raw values of a selected primary parameter sorted in N(N>1) zones at all operation conditions including adjustments of one or more secondary parameters, a software embedded in the internal logic control unit for executing calibration operation of the selected device parameter to deduce a calibrated value in any current operation condition using both a N-spline function of the selected primary parameter in each of the N zones and an adjustment multiplier associated with the one or more secondary parameters for each zone stored in the non-volatile memory, and a data communication interface configured to report the calibrated value; a calibration station comprising equipment to adjust the one or more secondary parameter, a test data communication bus connecting the host to one or more pre-calibrated measurement equipments configured to provide calibrated measurements of the selected device parameter, a test data generation block for data communication between the optical module and the host, a computer loaded with calibration software for assisting measurements of the selected primary parameter and the one or more secondary parameters, performing logic operation in defining the N zones, sorting measurement data in each zone, calculating coefficients for generating the N-spline function for the N zones, deducing multiple multiplicative factors for multiple value vertices of the one or more secondary parameters for each of the N zones, storing at least the coefficients for generating the N-spline function and the multiple multiplicative factors into the non-volatile memory of the optical module via a digital communication interface; wherein the calibrated value for the selected device parameter at any current operation condition is obtained by operating the internal logic control unit to calculate a basis-point calibrated value using the N-spline function generated by the coefficients for at a particular zone of the selected primary parameter corresponding to the current operation condition, to calculate the adjustment multiplier by interpolating the multiple multiplicative factors with corresponding weights depended on the one or more secondary parameters at the current operation condition with respect to at least two calibration points, and to multiply the adjustment multiplier to the basis-point calibrated value; measuring a current raw value of the selected primary parameter at a current set of values of the one or more secondary parameters; determining the current raw value in a first zone of the N zones if the current raw value is greater than a first starting value of the first zone and smaller than a first starting value of a second zone; generating a basis-point calibrated value of said selected device parameter based on the current raw value using the N-spline function in the first zone; performing a multi-linear interpolation based on the current set of values and multiple sets of the plurality of sets of values of the one or more secondary parameters for the first zone to calculate a first adjustment multiplier; performing a multi-linear interpolation based on the current set of values and alternative multiple sets of the plurality of sets of values of the one or more secondary parameters for the second zone to calculate a second adjustment multiplier; interpolating between the first adjustment multiplier and the second adjustment multiplier to obtain a final multiplier; and multiplying the final multiplier to the basis-point calibrated value to obtain a final calibrated value of the selected device parameter communicated to the host.

18. The system of claim 17 wherein said selected device parameter of the optical module is one selected from optical power including internally generated power from a laser source and externally transmitted or received power, optical modulation amplitude for both transmitted and received signal, laser frequency/wavelength per channel and wavelength shift from a target value, module temperature, power supply voltage, optical bias current, and thermo-electric cooler current, among which at least one is the selected primary parameter being utilized as a variable of the N-spline function.

19. The system of claim 17 wherein one or more secondary parameters comprises at least module temperature and power supply voltage.

20. The system of claim 17 further comprising performing automatic unit conversion between any calibrated value of the device parameter and corresponding raw values
of the primary parameter and the one or more secondary parameters in the internal control logic associated with all calibration measurements before performing any calibration calculations.

21. The system of claim 17 wherein generating a basis-point calibrated value of the selected device parameter comprises substituting the current raw value determined in the first zone into a polynomial function of order n of the N-spline function defined by the n+1 coefficients in the first zone determined in a calibration measurement with the one or more secondary parameters being a set of values selected to be a basis point.

22. The system of claim 17 wherein performing a multi-linear interpolation in the first zone comprises performing M-order multi-linear interpolation if there are M (M>1) number of secondary parameters for by taking a weighted average of 2M number of multiplicative factors at 2M number of vertices to calculate the first adjustment multiplier, each vertex corresponding to a set of values of the M number of secondary parameters, each of the 2M number of multiplicative factors being associated with a corresponding one of the multiple sets of values of the one or more secondary parameters previously assigned for the first zone and being stored in the non-volatile memory.

23. The system of claim 17 wherein interpolating between the first adjustment multiplier and the second adjustment multiplier comprises a linear interpolating between the first stating value of the first zone and the current raw value.

24. The system of claim 17 further comprising determining the current raw value of the selected primary parameter in a highest zone, performing a multi-linear interpolation based on the current set of values and alternate multiple sets of the plurality of sets of values of the one or more secondary parameters for the highest zone to calculate an adjustment multiplier, multiplying the adjustment multiplier to the basis-point calibrated value to obtain a final calibrated value of the selected device parameter to be communicated via a data communication interface in the microprocessor to the host.

* * * * *